United States Patent [19]

David et al.

[11] Patent Number: 5,594,069
[45] Date of Patent: Jan. 14, 1997

[54] PROCESS FOR PRODUCING MIXED POLY(VINYL ACETAL)S

[75] Inventors: Donald J. David, Amherst; Nestor A. Rotstein, East Longmeadow, both of Mass.

[73] Assignee: Monsanto Company, St. Louis, Mo.

[21] Appl. No.: 387,821

[22] PCT Filed: Dec. 4, 1992

[86] PCT No.: PCT/US92/10510

§ 371 Date: Feb. 17, 1995

§ 102(e) Date: Feb. 17, 1995

[87] PCT Pub. No.: WO94/13710

PCT Pub. Date: Jun. 23, 1994

[51] Int. Cl.⁶ .......................................... C08F 8/28
[52] U.S. Cl. ......................... 525/61; 525/60; 525/62; 525/383
[58] Field of Search .................... 525/61, 60, 62, 525/383

[56] References Cited

U.S. PATENT DOCUMENTS 2,116,635  5/1938  Matheson ........................ 525/61
5,019,624  5/1992  Gutweiler et al. ............... 525/61
5,137,954  8/1992  DasGupta ......................... 524/284

FOREIGN PATENT DOCUMENTS

457190A1  11/1991  European Pat. Off. .
1073203   1/1960   Germany .
1195900   1/1965   Germany .
873263    8/1959   United Kingdom .

Primary Examiner—Fred Zitomer
Attorney, Agent, or Firm—Fitzpatrick, Cella, Harper & Scinto

[57] ABSTRACT

A process for producing mixed poly(vinyl acetals) containing butyral acetal groups and long chain acetal groups derived from one or more aldehydes containing at least six C atoms, by conducting an acetalization reaction forming long chain acetal groups in the substantial of absence butyraldehyde until gel break occurs, adding butyraldehyde after gel break and continuing acetalization until the desired reaction endpoint is reached. Reaction temperature is from about 40° C. up to the boiling point of water at the pressure of the acetalization reaction and preferably between about 75° C. and about 98°.

34 Claims, No Drawings

PROCESS FOR PRODUCING MIXED POLY(VINYL ACETAL)S

BACKGROUND OF THE INVENTION

This invention relates to a process for producing mixed poly(vinyl acetal)s and more particularly to a process for producing partial polyvinyl butyral containing unreacted vinyl alcohol groups which is modified with long chain acetal groups.

Polyvinyl butyral is used as sheet in transparent laminated glazings, adhesive compositions, protective coatings, photoimaging applications, binders for ceramics and the like. Such resin contains 10 to 30 weight % unreacted vinyl alcohol groups and is hereinafter called "partial polyvinyl butyral" or "partial PVB". Partial polyvinyl butyral can be modified by including long chain acetal groups in the polymer for internal plasticizing, such partial polyvinyl butyral containing long chain acetal groups hereinafter called "mixed poly(vinyl acetal)s". In this regard note U.S. Pat. No. 5,137,954, issued Aug. 11, 1992. Such long chain acetal groups can broaden the utility of a mixed poly(vinyl acetal). For example, U.S. Pat. No. 5,137,954 discloses use of mixed poly(vinyl acetal)s with reduced amounts of external plasticizer and U.S. Pat. No. 5,019,624 discloses mixed poly(vinyl acetal)s without external plasticizer.

The size of resin particles formed during synthesis of partial PVB and mixed poly(vinyl acetal)s is important, particularly for laminated glazing applications. Particles too large can vary in hydroxyl content within the particle and can appear as visual defects in the transparent sheet of the glazing; particles too small present handling problems during formulation with other materials and can be an explosion hazard.

Partial PVB and mixed poly(vinyl acetal)s have been synthesized by acetalizing polyvinyl alcohol with butyraldehyde or mixtures of butyraldehyde and another aldehyde at low temperature on the order of 5°–20° C., followed over time as the reaction continues by a slow increase to about 50°–90° C. In this regard, note Example 1 of U.S. Pat. No. 5,137,954. When two aldehydes were used in such prior art, simultaneous formation of both acetal linkages occurred during the acetalization reaction. As far as is known, this acetalization temperature profile in the prior art was apparently intended to provide the desired resin particle size and minimize problems just referred to.

SUMMARY OF THE INVENTION

Now improvements have been made to optimize the process for producing mixed poly(vinyl acetal)s.

Accordingly, a principal object of this invention is to improve the process for producing mixed poly(vinyl acetal)s.

Another object is to provide an industrially valuable, high temperature, reduced cycle time process for preparing mixed poly(vinyl acetal)s.

A further object is to provide a process technique reducing the size and improving the size distribution of particles of mixed poly(vinyl acetal)s during their synthesis.

Another object is to make mixed poly(vinyl acetal)s without using low-temperature in the synthesis process.

Other objects will in part be obvious and will in part appear from the following description and claims.

These and other objects are accomplished by a process for producing mixed poly(vinyl acetal)s containing butyral acetal groups and long chain acetal groups derived from one or more aldehydes containing at least six C atoms which comprises a) conducting an acetalization reaction forming long chain acetal groups in the substantial absence of butyraldehyde until gel break (hereinafter defined) occurs, b) adding butyraldehyde after gel break, and c) continuing acetalization until the desired reaction end point is reached.

In another aspect, there is provided, in a process for producing partial polyvinyl butyral modified with long chain acetal groups which comprises a) acetalizing polyvinyl alcohol with butyraldehyde in the presence of an acid catalyst to form partial polyvinyl butyral having about 10 to 30 weight percent unreacted vinyl alcohol groups and b) neutralizing the partial polyvinyl butyral with a base, the step in combination therewith of: c) condensing the polyvinyl alcohol with one or more aldehydes containing at least six C atoms before conducting the butyraldehyde acetalizing step.

In a further aspect, a process is provided for producing mixed poly(vinyl acetal)s which comprises a) acetalizing polyvinyl alcohol with one or more long chain aldehydes, each containing at least six C atoms, at a temperature between about 40° C. to about 98° C. in an aqueous acidic solution until polymeric particles containing long chain acetal groups derived from said one or more long chain aldehydes precipitate out of solution, b) adding butyraldehyde to the reaction medium of a) while such medium is within the temperature range recited in a), and then c) continuing acetalization of the polyvinyl alcohol with butyraldehyde at a temperature greater than about 80° C. until the desired reaction end point is reached.

In a specific aspect, a process is provided for improving the efficiency of reaction during synthesis of mixed poly(vinyl acetal)s containing butyral acetal groups and long chain acetal groups derived from aldehydes having at least six C atoms which comprises a) conducting the acetalization reaction forming the long chain acetal groups at a temperature above about 50° C. in the substantial absence of butyraldehyde until gel break occurs, b) adding butyraldehyde to the reaction medium after a time interval greater than one minute subsequent to gel break without decreasing the temperature below about 50° C., and c) continuing acetalization until the desired reaction end point is reached.

In another aspect, a process is provided for producing mixed poly(vinyl acetal)s which comprises a) sequentially forming butyral acetal groups after first forming long chain acetal groups derived from one or more aldehydes having at least six C atoms during an acetalization reaction at a temperature which is always below boiling and greater than about 40° C.

DETAILED DESCRIPTION

The process of the invention produces mixed poly(vinyl acetal)s containing, based on weight of the poly(vinyl acetal), 10 to 30% by weight vinyl alcohol groups, about 0 to 3 % by weight vinyl acetate groups, 20 to 85 weight % butyral groups and an effective amount (weight %) sufficient to functionally modify the properties of the poly(vinyl acetal) of long chain acetal groups derived from one or more aldehydes containing at least 6 C atoms (LCA). Such effective amount of long chain acetal groups in a poly(vinyl acetal) ranges from more than incidental impurities up to 65 weight %. For laminated glazing applications, a preferred range is 5 to 55 weight % long chain acetal groups, most preferably 20 to 40 weight %.

In the process of the invention, acetalization of an aqueous, homogenous, polyvinyl alcohol (PVOH) solution to form long chain acetal groups is first conducted in the substantial absence of butyraldehyde. In this regard, trace amounts of butyraldehyde up to about 5 weight percent of the LCA in the first phase of the process do not adversely affect performance. After a brief period of operating this way, the length of which depends on the temperature of the reaction and is usually on the order of about 5 to 40 minutes, white polymeric particles precipitate out of the PVOH solution as an emulsion of condensed polyvinyl acetal containing such long chain acetal groups. This usually sudden, crisp change from clear homogeneous solution to a heterogeneous phase is referred to herein as "gel break". After gel break, the condensation reaction of PVOH with LCA is preferably continued, still without the presence of substantial butyraldehyde, for a finite variable time greater than one minute and which is usually about 15 to 90 minutes, to gradually further reduce the hydroxyl level of the reacting PVOH. Then, after a certain variable level of hydroxyl groups of the PVOH have reacted with the LCA, butyraldehyde is added and acetalization of the PVOH under the influence of the prior-formed long chain acetal groups is continued in situ in the single reaction zone to form butyral acetal groups until the desired end point of the condensation reaction is reached. Such end point is determined by the unreacted hydroxyl level (calculated as vinyl alcohol groups) desired in the final mixed poly(vinyl acetal) product.

After addition of butyraldehyde (or during addition if added over time) to the emulsion of PVOH partially reacted with LCA, significant growth of the mixed poly(vinyl acetal) particles begins. This can be visually detected in the transparent glass reactor embodiments of the Examples following and results in an average resin particle diameter of about 300–400 microns developed after gel break. When the reaction is conducted in this manner, i.e. sequentially forming butyral acetal groups after first forming long chain acetal groups, the tendency of the polymer particles to undesirably agglomerate or stick to each other is unexpectedly significantly reduced. In other words, acetalization with the LCA occurs to an extent effective to counteract and stabilize against later excess agglomeration as the particles increase in size in the presence of the reacting butyraldehyde and become richer in butyral content. This occurs to such an extent as to permit conducting the entire acetalization reaction at elevated temperature (to be further described) and avoids the low temperature phase so prominently used in the prior art.

In the process of the invention, phases of the acetalization reaction can be conducted at different temperatures. For example, though unnecessary pursuant this invention, PVOH and LCA can be reacted at temperatures as low as 20° C. It is, however, preferred for industrial practicality that acetalization be conducted at elevated temperature, which broadly is between (on the low end) about 40° C. (e.g. 50° C.) to (on the high end) just below (i.e. 2°–5° C.) the boiling point of water which varies with the pressure naturally developed in the water-containing reaction phase. Below about 40° C. the rate of LCA reaction with PVOH is usually too slow to be industrially practical. At or above the boiling point of the reaction medium containing water in which the PVOH is dissolved results in undesirable frothing of the polymerizing reactants, though this can be reduced by lowering agitation intensity and/or gradually adding butyraldehyde over a finite time period (i.e. greater than one minute) as opposed to adding it at once in a single charge. At reaction pressures above atmospheric, liquid butyraldehyde may be pumped under pressure into the reaction zone. Alternatively, at atmospheric reaction pressure the butyraldehyde may be added at a reaction temperature of about 73°–75° C. which is just below (i.e. within about 5° C.) the atmospheric boiling point of butyraldehyde. Under some circumstances, e.g. when using a very reactive LCA, the initial phase of acetalization prior to adding butyraldehyde can be conducted within the range of about 50° C. to about 150° C., but below the particular temperature within such range of butyraldehyde addition. For example, the initial LCA-PVOH reaction temperature up to and beyond gel break could be at least about 60° C. and then the temperature raised to about 73° C. before butyraldehyde addition. For convenience of operation and optimal results, the entire reaction is preferably conducted between about 75° to about 98° C., most preferably at least about 80° C., e.g. 80° to 95° C. at atmospheric pressure.

The high temperature process of the invention for synthesizing mixed poly(vinyl acetal)s wherein butyral acetal groups are sequentially formed after first forming long chain acetal groups during an acetalization reaction at a temperature which preferably is always greater than about 40° C., provides a facile way to control the size and size distribution(preferably narrow) of the polymer particles formed. Relatively small particles of narrow size distribution and therefore of improved size uniformity are more thoroughly neutralized after the reaction is complete and more uniformly plasticized downstream, which in turn provides improved control of sheet properties for safety glazing applications. Moreover, with the process of the invention reaction conversion efficiency (weight of reacted aldehydes divided by weight of aldehydes charged to the reaction, times 100) is improved (on the order of about 5%) over processes employing a low temperature phase in the reaction cycle. This environmentally compatible advantage is commercially important in reducing the amount of unconverted aldehyde for disposal or recycle, particularly considering the relatively expensive LCA components.

Any long chain aldehyde is usable which has at least six carbon atoms and is capable of reacting with PVOH to form at gel break an emulsion of polymer particles containing chemically combined long chain acetal groups. Usable LCA's include those which are acyclic, alicyclic or aromatic (containing one or more optionally substituted phenyl rings). Such LCA's may be substituted (singly or plurally) anywhere along the aldehyde chain or unsubstituted, straight or branched chain, saturated or unsaturated. Representative usable LCA's include n-hexyladehyde, 2-ethylbutyraldehyde, n-heptaldehyde, n-octylaldehyde, n-nonyladehyde, n-decylaldehyde, undecylaldehyde, benzaldehyde, cinnamaldehyde, 3-phenyl-1-butyraldehyde, undecylenic aldehyde (i.e. $H_2C=CH(CH_2)_8$ CHO), phenexal

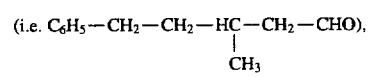

hexyl cynnamic aldehyde

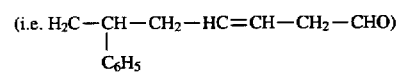

LCA's of any of the foregoing having 6 to 20 C. atoms are preferred; most preferred are aliphatic aldehydes containing 6 to 20 C. atoms such as 2-ethylhexaldehyde. The LCA's may be used either singly or in combination with one another.

Any known partially or completely hydrolyzed polyvinyl alcohol (including blends of different grades) is suitable as starting PVOH in the acetalization. It is preferred to use highly hydrolyzed polyvinyl alcohols having 0.5–3% by weight of vinyl acetate units and a viscosity as measured in accordance with DIN 53,015 at 20° C. on a 4% strength aqueous solution of between 5 and 45 mPa.s, preferably between 15 and 35 mPa.s.

The acetalization reaction occurs in the presence of catalytically acting acids used in customary concentration, for example between 0.1 and 10% by weight, preferably between 0.2 and 2% by weight, based on the aqueous PVOH phase. Since the acid can coarsen the polymer particles, it is advisable to work at sufficiently low concentrations as will enable the reaction to be carried out at industrially acceptable rates. Suitable acids and mixtures thereof are in particular strong mineral acids such as HCl, $H_2SO_4$, $HNO_3$, $HClO_4$, $H_3PO_4$ and the like, as well as aromatic and aliphatic sulfonic acids.

The acetalization reaction is started in customary manner by adding the LCA and acid in single successive charges or after first mixing together or by adding a little at a time of one or the other or both to the aqueous solution of PVOH. Butyraldehyde is later added as a single charge or, preferably, continuously during a time interval up to about 90 minutes, for example, 5 to 30 minutes. The reaction mixture must be continuously stirred, preferably vigorously, throughout the entire acetalization process.

The initial concentration (solids content) of PVOH in aqueous solution is usually about 4 to 10 weight % although other concentrations are usable. As solids content increases, the emulsion at gel break becomes denser and the final particle size distribution improves insofar as becoming narrower with the maximum size shifting toward a smaller size.

At completion of acetalization, the mixed poly(vinyl acetal) is in the form of a strongly acidic aqueous suspension with a solids content of between 5 and 25% by weight. The solids are isolated and converted into a flowable product by customary methods, for example, by centrifuging, washing and drying including neutralizing or alkalizing before, during or after these steps. The thoroughness of washing required depends on the acid content in the completed reaction suspension. The mixed poly(vinyl acetal) particles vary in size and have an average mean particle diameter of between about 1000 to 75 microns in which particles passing through a 30 M screen and retained on a 100 M screen (i.e. having a particle diameter of 600 to 150 microns) account for at least 50 weight % of all particles. They can be spherical, oval or the like in shape and usually have a smooth surface.

Conventional property-enhancing additives at customary concentrations (e.g. 0.05 to 1% by weight based on the precipitating acetalized polymer) may optionally be introduced to the reaction medium before or during acetalization. These additives include crosslinkers, emulsifiers, stabilizers, antioxidants, ultraviolet absorbers, glass adhesion control agents and the like.

The mixed poly(vinyl acetal) products are suitable for any use known for this type of polymer. As disclosed in U.S. Pat. No. 5,137,954, they are particularly suitable as sheeting in the production of laminated glass. For such applications, the mixed poly(vinyl acetal) is melt mixed and shaped, usually in a screw extruder in the optional presence of a plasticizing amount of external plasticizer, in a manner known to those skilled in the art, into a sheet for use with one or more rigid panels such as glass in a safety glazing.

The invention is further described in the following Examples which are not intended to limit or restrict the invention. Unless otherwise indicated, quantities and percentages are expressed in weight. PVOH means polyvinyl alcohol.

EXAMPLE 1

Preparation of poly(vinyl 2-ethyl hexyl acetal)-poly(vinyl butyral) by reacting PVOH with 2- ethyl hexaldehyde and n-butyraldehyde.

PVOH having a residual polyvinyl acetal content of less than 2% and molecular weight of 77,000 is dissolved in deionized water at 85°–90° C. in an agitated fluted glass reactor to obtain 7994 g of 8.7% solution. The temperatures noted in this and the other Examples are achieved by varying the temperature of a water bath in which the reactor is immersed. When temperature is given, both the temperature of the bath and the reaction mixture are measured with a thermometer. 269.3 g of 35% nitric acid catalyst and 227.7 g of 2-ethyl hexanal is added to the PVOH solution at 85°–95° C. After reacting for 5–7 minutes the initially clear solution becomes a creamy white emulsion. This is gel break. The reaction is continued for one hour after gel break. While the reaction mixture is at 85°–90° C., 280.5 gm of n-butyraldehyde is added over about one hour and the reaction is continued for about four more hours at 85°–90° C. Total reaction cycle time (after PVOH solution reaches 85°–90° C.) is about 6.5 hours. The reactor contents are washed to pH 4.0, neutralized with 45% potassium hydroxide to pH 10.0, held at this pH for one hour at 75° C. and then washed with water to pH 7.0. The product is then filtered and dried to less than 2% moisture. The composition (weight fraction) has the following analysis:

| | |
|---|---|
| vinyl acetate | 0.020 |
| vinyl alcohol | 0.181 |
| vinyl butyral | 0.499* |
| vinyl 2-ethylhexyl acetal | 0.300* |

*estimated, by mass balance using the efficiency noted below.

Particle size analysis (% retained on noted screen size) is as follows:

| Mesh size | % |
|---|---|
| 10 | 6.47 |
| 16 | 10.72 |
| 20 | 6.69 |
| 30 | 6.66 |
| 40 | 8.29 |
| 50 | 45.55 |
| 100 | 13.74 |
| 140 | 0.15 |
| 200 | 0.32 |

Screen analysis uses U.S. Standard Testing Sieve ASTME 11 specification wherein 30M has 600 microns openings and 100M has 150 microns openings. Combined aldehyde efficiency is 95%.

EXAMPLES 2, 3

The procedure of Example 1 through completion of the acetalization reaction is repeated except in one instance, (Ex. 2) 2-ethyl hexanal is replaced with phenexal, a branched aldehyde of 12 C atoms containing a substituted phenyl ring and in a second instance (Ex. 3) it is replaced with decanal, a saturated aldehyde of 10 C atoms. Reaction specifics are as follows:

Using phenexal 3302 g of 8.0% PVOH solution 68 g $HNO_3$ 95 g phenexal 110 g butyraldehyde gel break—at two minutes; held for 30 minutes; add butyraldehyde over 40 minutes; continue reaction for 2.5 hours after all butyraldehyde added.

Using decanal 3302 gm 8.0% PVOH solution 68 gm $HNO_3$ 90 gm decanal 107.5 gm butyraldehyde gel break—at five minutes; hold for 30 minutes; add butyraldehyde over 43 minutes; continue reaction for 2.5 hours after all butyraldehyde added.

The dried product particles are visually similar to those of Example 1 with Example 2 particles appearing somewhat larger than Example 3. Particle size distribution and aldehyde efficiency, if measured, should be similar to the results of Example 1.

Other LCA's can be interchangeably substituted for those used in the procedure of Examples 1–3 to form mixed poly(vinyl acetal) polymers having relatively narrow particle size distribution and high aldehyde to polymer reaction efficiency at commercially reasonable cycle times.

EXAMPLE 4

This explores a different reaction temperature schedule according to the invention.

The procedure of Example 1 is repeated except 2-ethyl hexanal is added to the PVOH solution at 40° C. Time elapsed between addition and gel break is 35 minutes. After gel break, the reaction temperature is increased to 85° C. and the remaining procedure of Example 1 followed. Reaction specifics are as follows:

3302 g of 8% PVOH 102 g of 35% $HNO_3$ 86.2 g of 2-ethyl hexanal

After gel break the reaction is continued for 35 minutes without butyraldehyde at 85° C. Add butyraldehyde over 30 minutes and continue reaction after butyraldehyde addition is complete for 2½ hours.

The product particles are visually observed to be comparable to those of Example 1. Though not measured, aldehyde efficiency and particle size distribution are predicted to be comparable to Example 1.

EXAMPLE C1

This control example conducts the acetalization reaction not according to the invention—i.e. with a significant low temperature period during the reaction cycle during which butyraldehyde and LCA simultaneously react with PVOH.

The procedure of Example 1 is repeated except as follows. The temperature of the initial PVOH solution is decreased from 85°–90° C. to 16° C. Then the following is added as a single charge:

81.6 g $HNO_3$ 251.6 g n-butyraldehyde 219.7 g 2-ethyl hexanal

The mixture is allowed to react at 16° C. with gel break occurring in 25 minutes. 97.9 g of 35% $HNO_3$ are added, the temperature increased to 85° C. and reaction continued for 4 hours. Total reaction time (after PVOH solution reaches 85°–90° C.) is 7.5 hours which includes 1.5 hours to lower the temperature to 16° C. The polymer composition (weight fraction) has the following analysis:

| | |
|---|---|
| vinyl acetate | 0.020 |
| vinyl alcohol | 0.191 |
| vinyl butyral | 0.489* |
| vinyl 2-ethyl hexyl acetal | 0.300* |

*estimated, by mass balance using the efficiency noted below.

Particle size analysis is as follows:

| Mesh Size | % |
|---|---|
| 10 | 14.25 |
| 16 | 32.03 |
| 20 | 26.69 |
| 30 | 22.44 |
| 40 | 4.23 |
| 50 | 0.02 |
| 100 | 0.00 |
| 140 | 0.00 |
| 200 | 0.00 |

The combined aldehyde efficiency is 90%

The above product data of this Example C1 is to be contrasted with Example 1. Reaction efficiency is lower by 5%, particle size is shifted to larger size and particle size distribution is broader. Total reaction cycle time is 15% longer.

Contrary to the traditional understandings and expectations of the prior art, in forming mixed poly(vinyl acetal)s the process of the invention can eliminate the low temperature phase of the acetalization process thereby conserving energy otherwise consumed in cooling the PVOH solution from an initial dissolution temperature of about 80°–90° C. to about 10°–20° C. followed, after polymer precipitation, by heating again to about 60°–80° C. to complete the reaction. Eliminating such a low temperature phase reduces polymerization time leading to increased capacity from existing and new facilities. Such energy savings are considerable and reduced cycle times important in commercial size manufacturing systems.

The preceding description is for illustration and should not to be taken as limiting. Various modifications and alterations will be readily suggested to persons skilled in the art. It is intended, therefore, that the foregoing be considered as exemplary only and that the scope of the invention be ascertained from the following claims.

We claim:

1. A process for producing mixed poly(vinyl acetal)s containing, based on the weight of poly(vinyl acetal), 20 to 85 weight % butyral acetal groups, 10 to 30 weight % vinyl alcohol groups and up to 65 weight % long chain acetal groups derived from one or more aldehydes containing at least six C atoms, said process comprising the steps of:

a) conducting an acetalization reaction forming said long chain acetal groups in the substantial absence of butyraldehyde until gel break occurs;

b) adding butyraldehyde after gel break; and c) continuing acetalization until reaching the desired reaction end point, wherein substantially the entire acetalization reaction is performed in the presence of an acid catalyst and the temperature during substantially the entire acetalization reaction is between about 40° to about 98° C.

2. The process of claim 1 wherein an emulsion is formed at gel break comprising polymer particles containing long chain acetal groups.

3. The process of claim 2 wherein the polymer particles of the emulsion increase in size after addition of the butyraldehyde.

4. The process of claim 3 wherein the acetalization reaction of a) continues for about 15 to 90 minutes after gel break and before adding butyraldehyde.

5. The process of claim 4 wherein butyraldehyde is gradually added continuously during a time interval up to about ninety minutes.

6. The process of claim 5 wherein the one or more aldehydes containing at least 6 C atoms includes 2-ethyl hexaldehyde.

7. The process of claim 6 wherein the mixed poly(vinyl acetal)s comprise 5 to 55 weight percent poly(vinyl 2-ethyl hexyl acetal).

8. In a process for producing partial polyvinyl butyral having 20 to 85 weight % butyral acetal groups modified with up to 65 weight % long chain acetal groups derived from one or more aldehydes containing at least six C atoms, said process comprising the steps of:

a) acetalizing polyvinyl alcohol with butyraldehyde in the presence of an acid catalyst to form partial polyvinyl butyral having 10 to 30 weight percent unreacted vinyl alcohol groups wherein the temperature during substantially the entire acetalization reaction is between about 40° to about 98° C.; and b) neutralizing the partial polyvinyl butyral with a base; the step in combination therewith of:

c) condensing said polyvinyl alcohol with one or more aldehydes containing at least six C atoms before conducting said acetalizing step.

9. The process of claim 8 wherein the one or more aldehydes each contain between six and twenty C atoms.

10. The process of claim 9 wherein the one or more aldehydes include 2-ethyl hexaldehyde.

11. The process of claim 10 wherein the partial polyvinyl butyral formed contains 5 to 55 weight percent poly(vinyl 2-ethyl hexyl acetal).

12. In the process for producing mixed poly (vinyl acetal)s containing, based on the weight of poly(vinyl) acetal, 20 to 85 weight % butyral acetal groups, 10 to 30 weight % vinyl alcohol groups and up to 65 weight % long chain acetal groups derived from one or more aldehydes containing at least six C atoms, said process comprising, acetalizing polyvinyl alcohol with butyraldehyde and one or more long chain aldehydes containing at least six C atoms in an aqueous medium in the presence of an acid catalyst, the improvement which comprises delaying addition of the butyraldehyde to the aqueous medium until after gel break occurs and conducting said process at a temperature between about 40° to about 90° C.

13. A process for producing mixed poly (vinyl acetal)s containing, based on the weight of poly(vinyl) acetal, 20 to 85 weight % butyral acetal groups, 10 to 30 weight % vinyl alcohol and up to 65 weight % long chain acetal groups derived from one or more aldehydes containing at least six C atoms, said process comprising:

a) acetalizing polyvinyl alcohol with one or more long chain aldehydes, each containing at least six C atoms, at a temperature between about 40° C. to about 98° C. in an aqueous acidic solution until polymeric particles containing long chain acetal groups derived from said one or more long chain aldehydes precipitate out of solution;

b) adding butyraldehyde to the reaction medium of a) while said medium is within the temperature range recited in a); and then c) continuing acetalization of the polyvinyl alcohol with butyraldehyde at a temperature at least about 80° C. until the desired reaction end point is reached.

14. The process of claim 13 wherein a) continues for a finite time before b) occurs.

15. The process of claim 14 wherein the one or more long chain aldehydes include 2-ethyl hexaldehyde.

16. The process of claim 15 wherein during c) butyraldehyde is added gradually over a time period up to about 90 minutes.

17. The process of claim 16 wherein the mixed poly(vinyl acetal)s formed include 5 to 55 weight percent poly(vinyl 2-ethyl hexyl acetal).

18. A process for improving the efficiency of reaction during synthesis of mixed poly(vinyl acetal)s containing, based on the weight of poly(vinyl) acetal, 20 to 85 weight % butyral acetal groups, 10 to 30 weight % vinyl alcohol and up to 65 weight % long chain acetal groups derived from aldehydes having at least six C atoms which comprises:

a) conducting the acetalization reaction forming the long chain acetal groups at a temperature above about 50° C. in the substantial absence of butyraldehyde until gel break occurs;

b) adding butyraldehyde to the reaction medium after a finite time interval greater than one minute subsequent to gel break without decreasing the temperature below about 50° C.; and then c) continuing acetalization until the desired reaction end point is reached wherein substantially the entire acetalization reaction is conducted in the presence of an acid catalyst.

19. The process of claim 18 wherein the temperature during a) is less than the boiling point of water at the pressure of the acetalization reaction.

20. The process of claim 19 wherein the temperature during a) is about 2° to 5° C. below the boiling point of water at the pressure of the acetalization reaction.

21. The process of claim 19 wherein the temperature of the reaction medium when butyraldehyde is added is within about 5° C. below the atmospheric boiling point of butyraldehyde.

22. The process of claim 20 wherein the temperature during c) is at least about 80° C.

23. The process of claim 21 wherein a time interval of about 15 to 90 minutes occurs after gel break and before addition of the butyraldehyde.

24. The process of claim 23 wherein the long chain aldehyde is 2 ethyl hexaldehyde.

25. The process of claim 24 wherein the mixed poly(vinyl acetal)s contains 5 to 55 weight percent poly(vinyl 2-ethyl hexyl acetal).

26. The process of claim 24 wherein the mixed poly(vinyl acetal)s contains 20 to 40 weight percent poly(vinyl 2-ethyl hexyl acetal).

27. The process of claim 25 wherein during b) the butyraldehyde is added over a time period up to about 90 minutes.

28. A process for producing mixed poly(vinyl acetal)s containing, based on the weight of poly(vinyl) acetal, 20 to 85 weight % butyral acetal groups, 10 to 30 weight % vinyl alcohol and up to 65 weight % long chain acetal groups derived from aldehydes having at least six C atoms, said process comprising:

a) sequentially forming butyral acetal groups after first forming long chain acetal groups derived from one or more aldehydes having at least six C atoms during an acetalization reaction at a temperature which is always below boiling and greater than about 40° C. in the presence of an acid catalyst.

29. The method of claim 28 wherein the acetalization reaction occurs in a single reaction zone.

30. The method of claim 29 wherein the temperature of the reaction medium during the entire acetalization reaction is between 80° to 95° C.

31. Mixed poly(vinyl acetal)s produced by the process of any of claims 1, 8, 12, 13, 18, or 28.

32. Mixed poly(vinyl acetal) of claim 31 containing poly(vinyl 2-ethyl hexyl acetal).

33. The mixed poly(vinyl acetal) of claim 32 wherein the content of poly(vinyl 2-ethyl hexyl acetal) in the mixed poly(vinyl acetal) is 5 to 55 weight percent.

34. The mixed poly(vinyl acetal) of claim 33 wherein the content of poly(vinyl 2-ethyl hexyl acetal) in the mixed poly(vinyl acetal) is 20 to 40 weight percent.

* * * * *

UNITED STATES PATENT AND TRADEMARK OFFICE
CERTIFICATE OF CORRECTION

PATENT NO. : 5,594,069

DATED : January 14, 1997

INVENTOR(S) : DONALD J. DAVID, ET AL.

It is certified that error appears in the above-identified patent and that said Letters Patent is hereby corrected as shown below:

ON THE TITLE PAGE

AT [57] ABSTRACT

Line 1, "acetals)" should read --acetal)s--.
Line 5, "of absence" should read --absence of--.
Line 11, "98°." should read --98°C.--.

COLUMN 2

Line 3, "from-one" should read --from one--.

COLUMN 9

Line 46, "the" should read --a--.
Line 47, "poly(vinyl)" should read --poly(vinyl--.
Line 48, "acetal," should read --acetal),--.
Line 60, "poly(vinyl) acetal," should read
        --poly(vinyl acetal),--.

COLUMN 10

Line 23, "poly(vinyl) acetal," should read
        --poly(vinyl acetal),--.
Line 60, "claim 24" should read --claim 25--.
Line 67, "poly(vinyl) acetal," should read
        --poly(vinyl acetal),--.

UNITED STATES PATENT AND TRADEMARK OFFICE
CERTIFICATE OF CORRECTION

PATENT NO. : 5,594,069

DATED : January 14, 1997

INVENTOR(S) : DONALD J. DAVID, ET AL.

It is certified that error appears in the above-identified patent and that said Letters Patent is hereby corrected as shown below:

COLUMN 11

Line 11, "method" should read --process--.
    Line 13, "method" should read --process--.

Signed and Sealed this

Sixteenth Day of September, 1997

*Attest:*

BRUCE LEHMAN

*Attesting Officer*       *Commissioner of Patents and Trademarks*